This invention relates to an improved flexible hanger for vehicle exhaust systems.

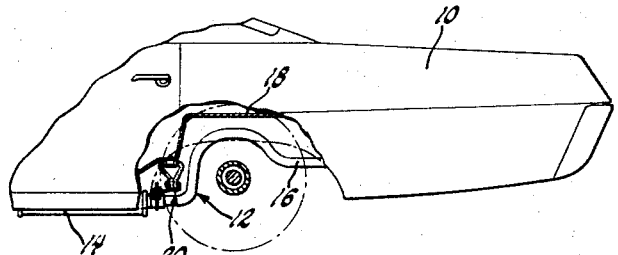
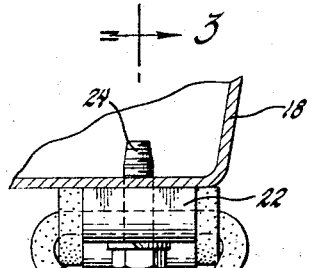
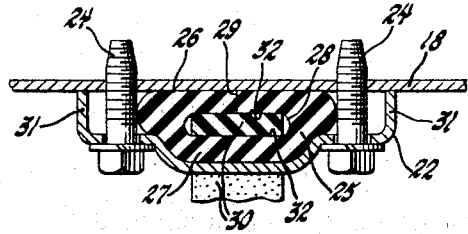
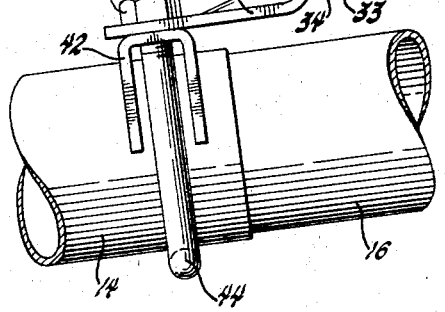
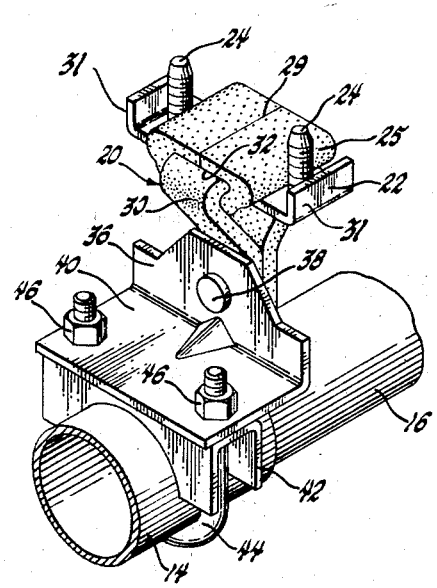
INVENTORS
Thomas R. Cassel &
Harry L. Redding
BY
J. L. Carpenter
ATTORNEY 3,292,887
EXHAUST SYSTEM HANGER
Thomas R. Cassel, Birmingham, and Harry L. Redding, Pontiac, Mich., assignors to General Motors Corporation, Detroit, Mich., a corporation of Delaware
Filed Oct. 5, 1965, Ser. No. 493,067
4 Claims. (Cl. 248—60)

It is known to provide hangers for flexibly supporting an exhaust system on a vehicle to reduce the transmission of vibrations from the exhaust system to the passenger compartment. These hangers generally include a loop member of flexible material rigidly attached to spaced mounting brackets which are secured to the vehicle body and to the exhaust system. Such hangers are effective to partially damp exhaust system vibrations by flexure of the loop member.

This invention completley damps such vibrations by providing an insulating member which frictionally grips the loop member and secures the hanger to the body. The loop member can thus both flex and slidably move relative to the insulating member when the exhaust system vibrates. The friction losses associated with this movement, in addition to the flexure losses, are effective to completely damp the exhaust system vibrations.

One feature of this invention is that it provides a hanger which completely dissipates the vibrational energy of a vehicle exhaust system. Another feature of this invention is that it provides a hanger which includes a loop member of energy absorbing flexible material which is frictionally gripped about its upper portion by a resilient insulating member and is free to move relative to the insulating member under vibratory conditions to dissipate vibrational energy. Yet another feature of the invention is that exhaust system vibrational energy is dissipated by frictional losses resulting from relative movement between various components of the hanger.

The features of the invention will be apparent from the following description taken in conjunction with the accompanying drawings wherein:

FIGURE 1 is a partially broken away partial view of a vehicle having an exhaust system embodying a hanger according to the present invention;

FIGURE 2 is an enlarged view of a portion of FIGURE 1;

FIGURE 3 is a view taken generally along the plane indicated by line 3—3 of FIGURE 2; and FIGURE 4 is a perspective view.

Referring to FIGURE 1, a conventional motor vehicle 10 has a conventional exhaust system 12 which includes a muffler 14 and a tubular exhaust member or pipe 16. The exhaust system is located generally longitudinally of the vehicle and is attached to the body 18 by an exhaust system hanger 20, according to this invention.

As best seen in FIGURES 2 and 3, the hanger 20 includes an upper mounting bracket 22 which is bolted to the body 18 at 24. An insulating sleeve 25 of resilient material, preferably rubber, is retained between the bracket 22 and body 18. The sleeve 25 is generally oblong in cross-section with a flat upper surface 26 in engagement with a flat portion of the body 18 and an oppositely disposed outwardly protruding portion 27 which is received within a complementary shaped depressed portion of the bracket 22. The sleeve has a horizontally disposed slot 28 extending through a center portion thereof and a slit 29 extends from the surface 26 to the slot 28 to provide access means for inserting a loop member or insulator 30 into the slot. The bracket 22 has inwardly extending outer flanges 31 which seat against the body 18 when the bracket is bolted thereto to limit the compressive load applied to the sleeve 25 by the bracket so that a predetermined force can be maintained upon the portion of the insulator within the slot.

The insulator 30 is preferably formed from a strip of tire carcass and has flat surfaces 32 which engage the mating surfaces of sleeve 25 defining the slot 28 to ensure that a relatively large frictional area exists between these members. The insulator is prevented from moving within the slot by the frictional force existing between the two members, but under vibratory conditions the frictional force is overcome and relative movement between the insulator and sleeve occurs.

The insulator end portions 33 and 34 are securely fastened together and to a generally L-shaped mounting bracket 36 by a rivet 38. Bracket 36 has a longitudinally extending arm 40 located above the exhaust member 16. A saddle member 42 and U-bolt 44 encircle the telescoped ends of the exhaust member and muffler and secure them to the bracket 38 at 46.

When the vehicle is operated, vibrations are transmitted to the exhaust system. A portion of the vibrational energy is dissipated by flexure of the loop member or insulator 30 and of the resilient insulating sleeve 25. The remaining portion is dissipated through friction losses associated with the frictional interaction between the insulator 30 and the sleeve 25 and between the sleeve 25 and mating portions of the bracket 22 and body 18. Relative movement between the insulator 30 and sleeve 25 is especially important since the relatively large friction surfaces involved are capable of dissipating a large amount of energy. The energy losses, in total, are equal to the amount of vibrational energy introduced into the exhaust system.

Thus this invention provides an improved exhaust system hanger.

We claim:

1. Hanger means for connecting a vehicle exhaust system to a vehicle body comprising, an insulating member of resilient material, means for mounting said member on a body, a loop member of flexible material having a portion thereof frictionally gripped by said insulating member, and means for securing an exhaust system to said loop member, said loop member being relatively movable with respect to said insulating member in response to exhaust system vibrations to thereby frictionally damp said vibrations.

2. Hanger means as recited in claim 1 wherein said insulating member includes a sleeve receiving said loop member therethrough, said mounting means compressing said sleeve to provide a predetermined frictional gripping force between said loop member and said sleeve, said gripping force preventing free movement of said loop member within said sleeve, but permitting limited movement of said loop member relative to said sleeve to absorb exhaust system vibrational energy.

3. Hanger means as recited in claim 2 wherein said mounting means includes a bracket for receiving said sleeve and clamping said sleeve to a body.

4. Hanger means as recited in claim 3 wherein said bracket includes inwardly extending flanges which seat against a body to position said bracket about said sleeve and limit the amount of compressive force applied to said sleeve.

References Cited by the Examiner

UNITED STATES PATENTS

| | | | |
|---|---|---|---|
| 2,641,425 | 6/1953 | Ostberg | 248—18 |
| 2,744,706 | 5/1956 | Gerdry | 248—60 |
| 2,981,351 | 4/1961 | Knickerbocker et al. | 180—64 |
| 3,161,252 | 12/1964 | Brown | 180—64 |

FOREIGN PATENTS 508,248   12/1954   Canada.

CLAUDE A. LE ROY, *Primary Examiner.*